(12) United States Patent
Michell

(10) Patent No.: US 11,832,608 B2
(45) Date of Patent: Dec. 5, 2023

(54) CRITTER DEFLECTOR

(71) Applicant: Robert F. Michell, Macclenny, FL (US)

(72) Inventor: Robert F. Michell, Macclenny, FL (US)

(*) Notice: Subject to any disclaimer, the term of this patent is extended or adjusted under 35 U.S.C. 154(b) by 303 days.

(21) Appl. No.: 17/452,370

(22) Filed: Oct. 26, 2021

(65) Prior Publication Data

US 2022/0125035 A1    Apr. 28, 2022

Related U.S. Application Data

(60) Provisional application No. 63/198,545, filed on Oct. 26, 2020.

(51) Int. Cl.
*A01M 29/30* (2011.01)

(52) U.S. Cl.
CPC .................. *A01M 29/30* (2013.01)

(58) Field of Classification Search
CPC ..... A01G 13/10; A01G 13/105; E04H 17/003
See application file for complete search history.

(56) References Cited

U.S. PATENT DOCUMENTS

| | | | |
|---|---|---|---|
| 9,693,549 B1* | 7/2017 | Gomez, Jr. | A01M 29/30 |
| 11,246,303 B2* | 2/2022 | Bost | A01M 1/02 |
| 2013/0067796 A1* | 3/2013 | Dong | A01M 29/30 43/109 |
| 2016/0040820 A1* | 2/2016 | Morris | F15D 1/04 138/89 |
| 2016/0138284 A1* | 5/2016 | Murphy | E04F 11/1861 52/741.3 |
| 2019/0000068 A1* | 1/2019 | Williams | A01M 29/30 |
| 2020/0015473 A1* | 1/2020 | Moore | E04H 17/003 |
| 2021/0051864 A1* | 2/2021 | Washko | A01G 13/105 |
| 2022/0132753 A1* | 5/2022 | McMenamy | A01M 29/30 43/58 |

* cited by examiner

*Primary Examiner* — Gisele D Ford
(74) *Attorney, Agent, or Firm* — Mark Young, PA

(57) ABSTRACT

A deflector apparatus includes a curved wall, a vertical mounting flange and a base. The curved wall includes a concave side. The vertical mounting flange is mounted to a wall, adjacent to an opening (e.g., a garage door) with the concave side facing away from the opening, and the base on the ground at the opening. The base may comprise a bottom edge of the wall, or a bottom flange, or a bottom wall. A deflector may be located at each side of the opening with the concave side facing away from the opening. The deflector is sized and configured to deter or deflect common pests.

20 Claims, 16 Drawing Sheets

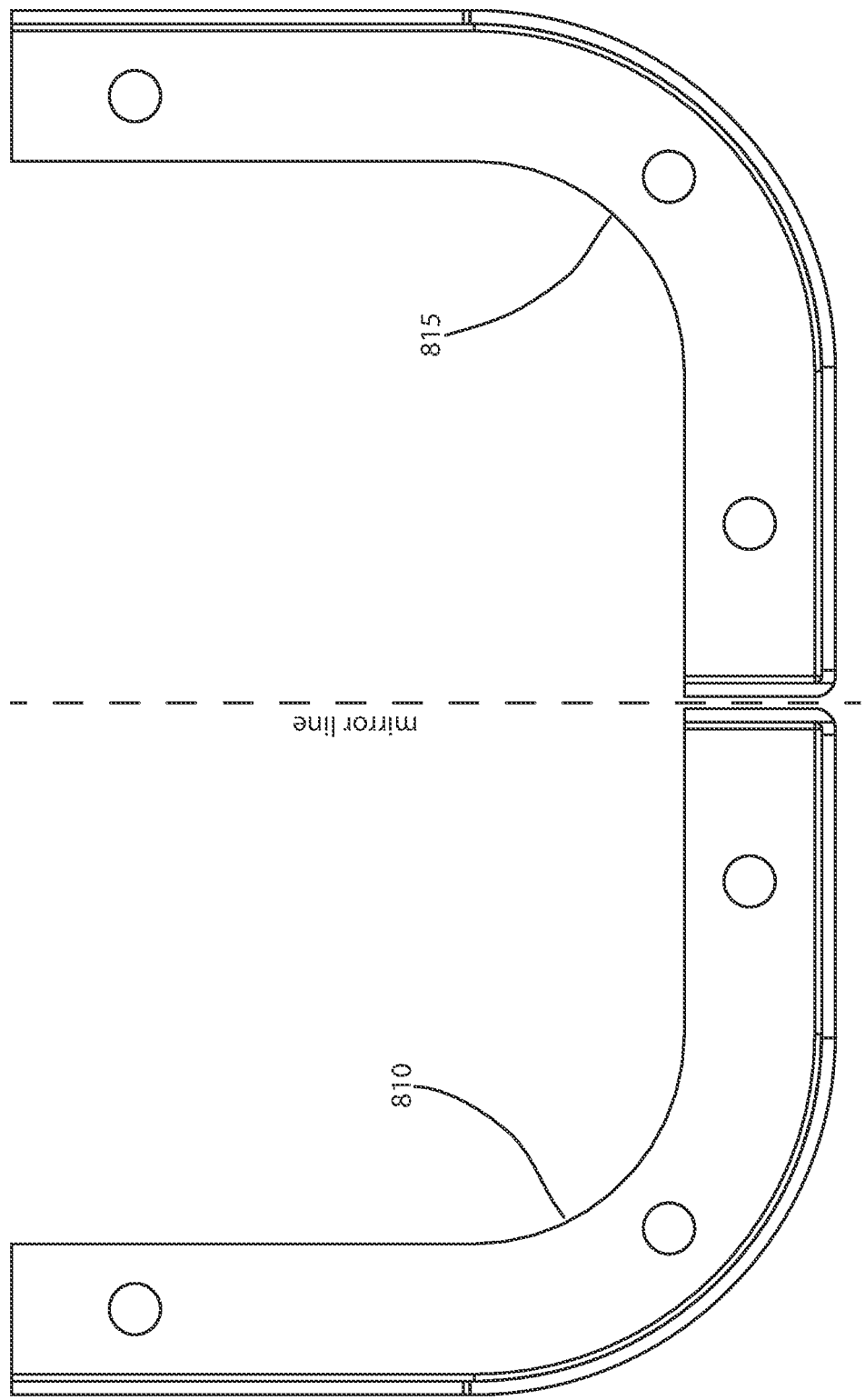

CRITTER DEFLECTOR

RELATED APPLICATION

This application is a nonprovisional of and claims the benefit of priority of U.S. Provisional Application No. 63/198,545 filed Oct. 26, 2020, the entire contents of which are incorporated herein by this reference.

FIELD OF THE INVENTION

This invention relates generally to pest control, and, more particularly, to an apparatus and method of using the apparatus for deterring unwanted animals from entering enclosed spaces through open doorways.

BACKGROUND

Animal pests, including rodents, lizards, frogs and toads enter garages when access to favorable environmental conditions, shelter or food exist. Often such animals feel their way along exterior walls until they reach an entrance. Lighting, warmth and/or odors emanating from a garage through an open garage door entices the animal. An unsuspecting occupant may inadvertently allow many such animals into the garage every day. Once inside the garage, the animal may suffer from a lack of food and water, defecate, and eventually die. The unpleasant odor from feces and decay can be considerable.

While placement of traps and poisons are well known methods for preventing intrusion, such methods are brutally unpleasant and unacceptable to many people. What is needed is a non-lethal, non-harmful apparatus and method for substantially reducing the risk of unwanted intrusions.

Also needed is a device and method that not only helps prevent animal intrusions, but also helps prevent trash from entering a structure, such as home or garage, through the corners and edges of a door.

The invention is directed to overcoming one or more of the problems and solving one or more of the needs as set forth above.

SUMMARY OF THE INVENTION

To solve one or more of the problems set forth above, in an exemplary implementation of the invention, a critter deflector apparatus includes a curved wall, a vertical mounting flange and a base. The curved wall includes a concave side. The vertical mounting flange is mounted to a wall, adjacent to an opening (e.g., a garage door) with the concave side facing away from the opening, and the base on the ground at the opening. A left-side critter deflector may be located at the left side of the opening. A right-side critter deflector may be located at the right side of the opening.

The curved wall may comprise a single sheet or a plurality of adjoined segments.

Segments may include male and female joint elements, such as a mating tail and socket, to join separate segments together. Alternatively, snap fit connections may join the separate segments. Additionally, a wall may be rigid or flexible. In some embodiments, a flexible wall may facilitate storage in a substantially planar configuration. During installation, the flexible wall may be shaped and anchored or otherwise secured in a desired curved position. In other embodiments the wall may be conformable thermoplastic shaped after mild heating with a heat gun. In yet other embodiments, the wall may be malleable, such as by including a malleable metal frame on a flexible plastic wall.

The vertical mounting flange may extend from either or both sides of a vertical edge of the wall. The vertical mounting flange may be a solid flange. During installation, the flange may be bonded to a wall. Alternatively, the flange may be mechanically fastened to a wall with screws. In another embodiment, the flange may include pre-formed holes or keyhole slots for mechanical fastening with screws.

The base may comprise a bottom edge of the wall and vertical flange, or a bottom flange extending horizontally from the bottom edge of the wall, or a bottom wall extending horizontally from the bottom edge of the wall. The base helps to stabilize the deflector on the ground. During installation, the base may be bonded to the ground. Alternatively, a bottom flange or wall may be mechanically fastened to the ground with screws. The bottom flange or wall may include pre-formed holes or keyhole slots for mechanical fastening with screws. The bottom flange or wall may also include perforations for drainage. The bottom flange or wall may be buried or covered with soil, pebbles, gravel, mulch, other aggregate and the like, depending upon the location of the critter deflector and user preferences.

A method of impeding critter intrusion entails steps of mounting right and left side critter deflectors adjacent to the right and left side of an opening to an enclosed space. A right side critter deflector may be mounted to the right side of an opening to an enclosed structure. A left side critter deflector may be mounted to the left side of an opening to an enclosed structure. The base of each deflector is at the ground. Each critter deflector is oriented with a concavity of a curved wall facing away from the opening. The vertical flange of each deflector may be mounted (e.g., bonded or mechanically fastened) to an exterior wall of the enclosed space near the opening. An animal moving along the wall towards the opening will be impeded by the wall of the critter deflector. The deflector will redirect the impeded animal away from the opening.

One exemplary critter deflector for attachment adjacent to an edge of a building entrance includes a curved wall having a proximal portion, a distal portion, a curved portion, a top edge and a bottom end. The proximal portion of the curved wall is about perpendicular (+/−10 degrees) to the distal portion of the curved wall. The curved portion extends from the proximal portion to the distal portion. The proximal portion includes a proximal end. A vertical flange is attached to the proximal end of the proximal portion of the curved wall. A horizontal flange is attached to the bottom end of the curved wall. The proximal portion, curved portion and distal portion define a concave compartment having a width (measured from the vertical flange to the free end of the distal portion) of at least 3 inches. The proximal portion of the curved wall has a height of at least 4 inches. A second critter deflector is a mirror copy of the first critter deflector. A mirroring line is parallel to the vertical flange and aligned with the proximal portion of the curved wall. The vertical and horizontal flanges of each critter deflector may have a plurality of mounting holes. The curved wall may have a radius of curvature of at least 2 inches. The curved portion of the curved wall may have an arc length of at least 2.5 inches. The distance between the bottom end and the top edge may decrease from the curved portion of the curved wall to the distal portion of the curved wall. The top edge of the distal portion of the curved wall may define an arc having a radius of curvature of at least 3 inches.

In one embodiment, the horizontal flange constitutes a base that extends from the bottom edge, perpendicular to the vertical flange. The base has a first edge and a second edge. The first edge is aligned with the vertical flange. The second edge is perpendicular to the first edge and extends to the bottom edge at the distal portion of the curved wall. Such a base may be perforated with a plurality of openings.

A building wall may have an entrance (e.g., a garage door or other door) with a first side edge and a second side edge. The first critter deflector may be positioned adjacent to the first side edge of the entrance with the vertical flange of the first critter deflector being against the wall, and the concave compartment of the first critter deflector facing away from the entrance. The second critter deflector may be positioned adjacent to the second side edge of the entrance with the vertical flange of the second critter deflector being against the wall, and the concave compartment of the second critter deflector facing away from the entrance. The vertical flange of the each critter deflector may be attached to the wall.

In each embodiment, the critter deflectors may be integrally formed. Additionally, each critter deflector may be formed of molded (e.g., injection molded) plastic.

BRIEF DESCRIPTION OF THE DRAWINGS

The foregoing and other aspects, objects, features and advantages of the invention will become better understood with reference to the following description, appended claims, and accompanying drawings, where:

FIG. 18 is a plan view that conceptually illustrates a pair of deflectors according to principles of the invention, with one deflector being a mirror copy of the other deflector.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

A critter deflector apparatus according to principles of the invention includes a curved wall, a vertical mounting flange and a base. The curved wall includes a concave side. The vertical mounting flange is mounted to a wall, adjacent to an opening (e.g., a garage door) with the concave side facing away from the opening, and the base on the ground at the opening. A left side critter deflector may be located at the left side of the opening. A right-side critter deflector may be located at the right side of the opening.

Figure 1:
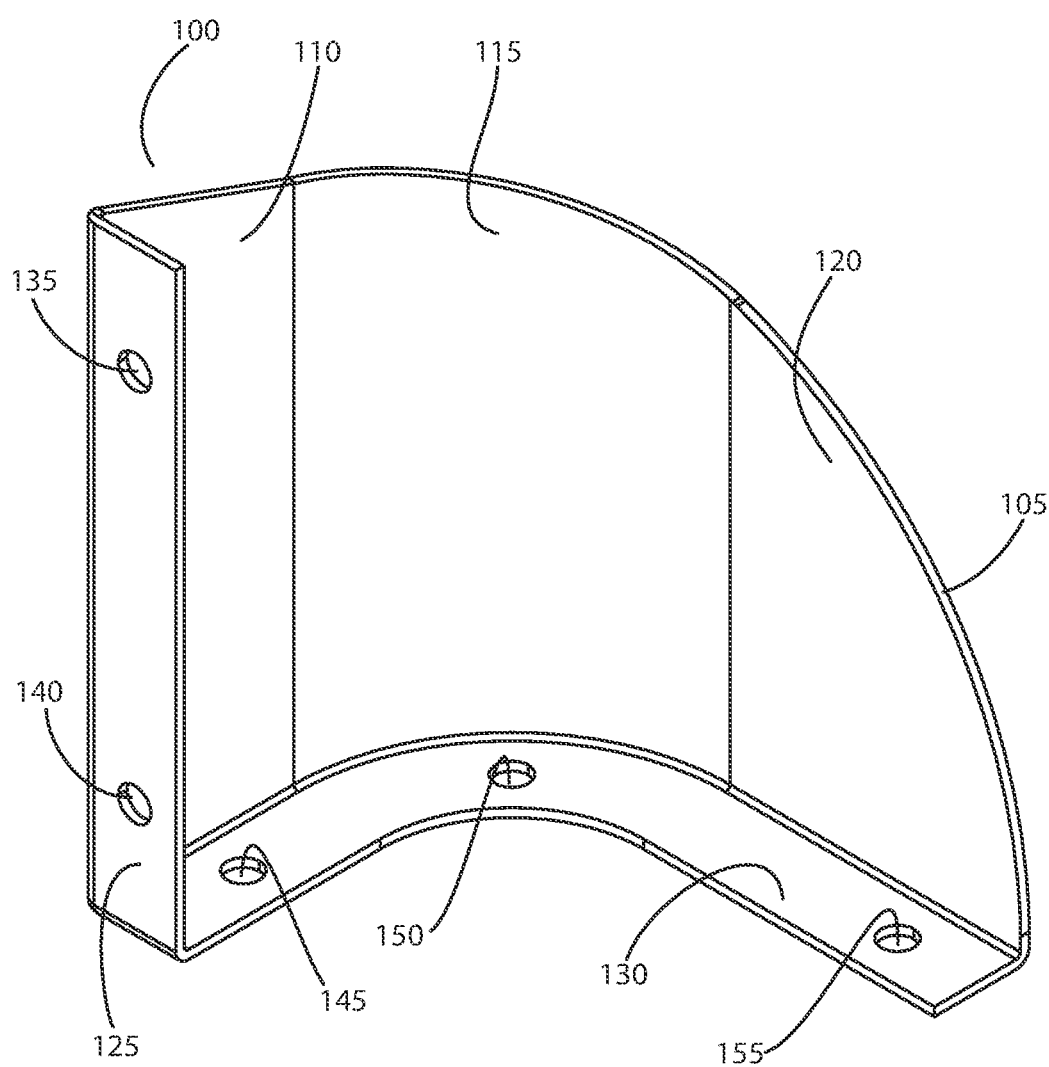
FIG. 1 is a perspective view of an exemplary right-side deflector according to principles of the invention.

With reference to FIG. 1, a perspective view of an exemplary right-side deflector 100 according to principles of the invention is provided. The deflector 100 includes a curved wall 105, with a concave side 115, a proximal portion of the wall 110 extending at a right angle from the vertical flange 125, and a distal portion of the wall 120 extending substantially parallel to the vertical flange 125. The base is comprised of a bottom flange 130. The vertical flange 125 extends from a vertical edge of the wall 105 in substantially the same direction as the distal portion 120 of the wall 105. The bottom flange 130 extends outwardly from the bottom edge of the wall 105 on the same side of the wall 105 from which the vertical flange 125 extends. Mounting holes 135-155 are provided in the flanges 125, 130. The flanges 125, 130 may be mechanically fastened to an exterior wall and ground with screws and/or anchors, or may be bonded with an adhesive or double-sided tape.

Figure 2:
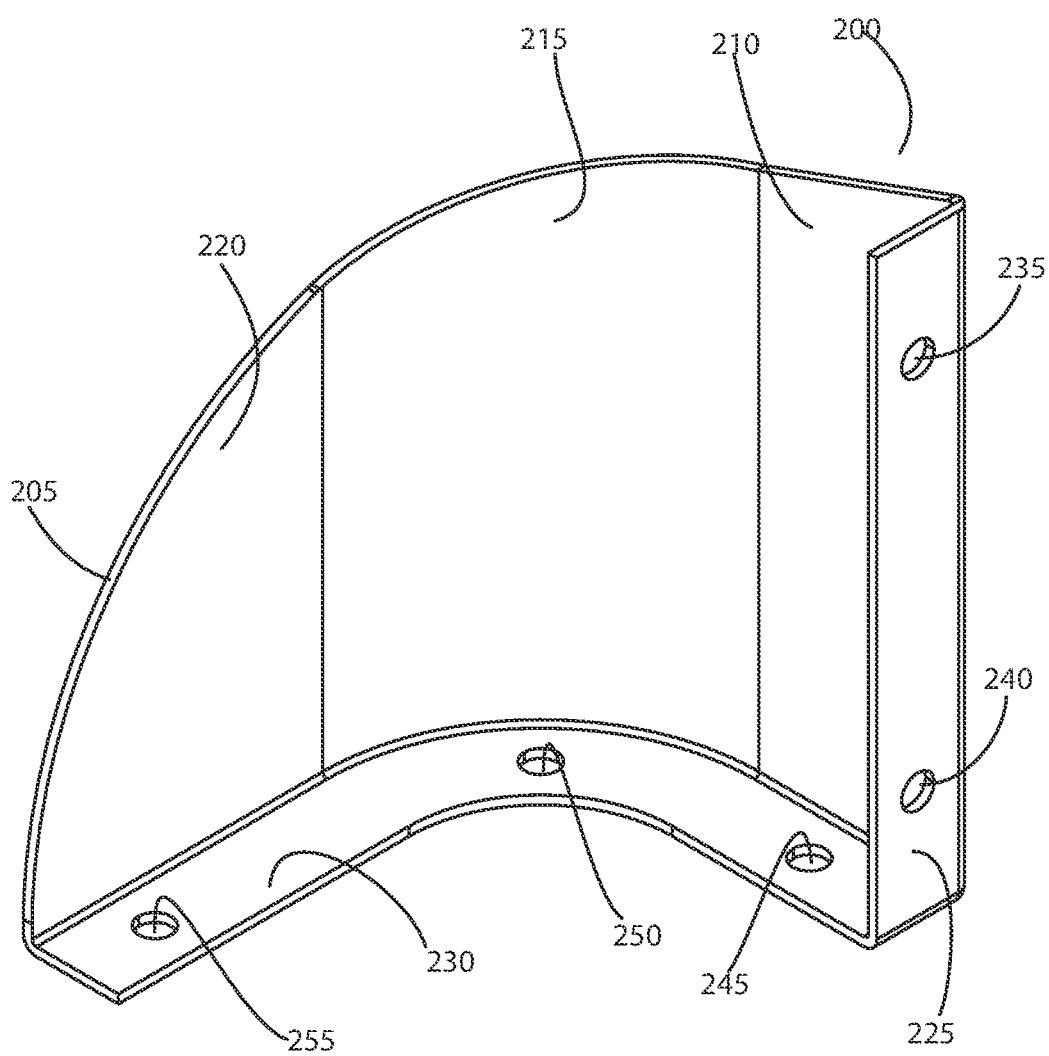
FIG. 2 is a perspective view of an exemplary left-side deflector according to principles of the invention.

FIG. 2 is a perspective view of an exemplary left-side deflector 200 according to principles of the invention. The deflectors of FIGS. 1 and 2 comprise a matching pair of deflectors, each of which may be located near a side of an opening. They are mirrored structures.

With reference to FIG. 2, the deflector 200 includes a curved wall 205, with a concave side 215, a proximal portion of the wall 210 extending at a right angle from the vertical flange 225, and a distal portion of the wall 220 extending substantially parallel to the vertical flange 225. The base is comprised of a bottom flange 230. The vertical flange 225 extends from a vertical edge of the wall 205 in substantially the same direction as the distal portion 220 of the wall 205. The bottom flange 230 extends outwardly from the bottom edge of the wall 205 on the same side of the wall 205 from which the vertical flange 225 extends. Mounting holes 235-255 are provided in the flanges 225, 230. The flanges 225, 230 may be mechanically fastened to an exterior wall and ground with screws and/or anchors, or may be bonded with an adhesive or double-sided tape.

Figure 3:
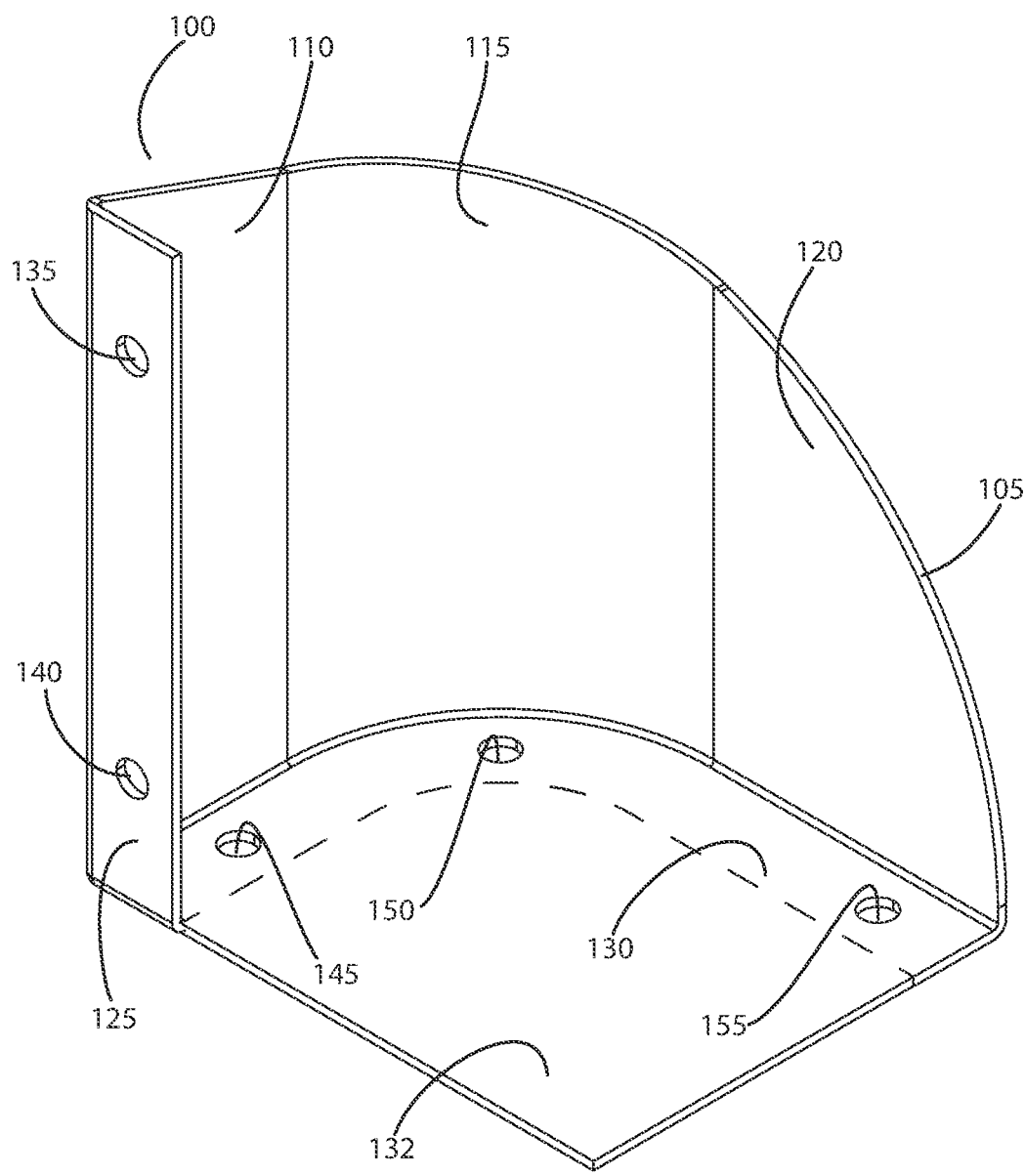
FIG. 3 is a perspective view of another exemplary right-side deflector according to principles of the invention.

FIG. 3 is a perspective view of the exemplary right-side deflector 100 of FIG. 1, with a modified base. The base is comprised of a bottom wall 132 extending horizontally from the bottom edge of the wall 105 between the flanges 125, 130. The bottom wall provides a broad support base for the deflector 100. The bottom wall 132 may be a separate component attached to the bottom flange 130. Such attachment may be made by snap fit coupling, tongue and groove coupling, mechanical fastening, bonding, ultrasonic welding, or any other means for joining walls edge to edge. Alternatively, the bottom wall 132 and bottom flange 130 may be integrally formed.

Figure 4:
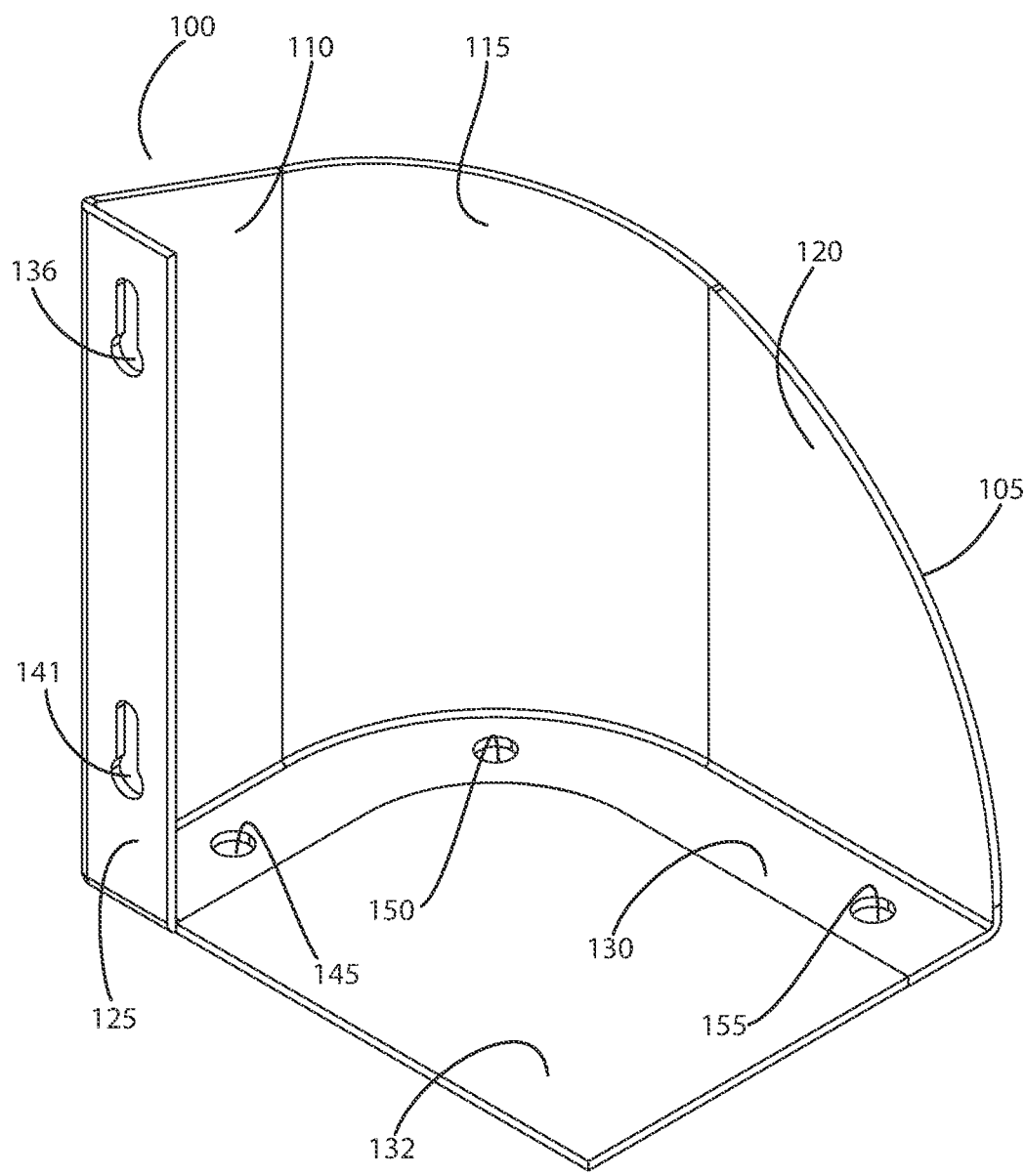
FIG. 4 is a perspective view of another exemplary right-side deflector according to principles of the invention.

Referring to FIG. 4, a perspective view of an alternative exemplary embodiment of the right-side deflector 100 according to principles of the invention is provided. In this embodiment, the vertical flange includes keyhole slots 136, 141, to facilitate attachment and removal from an exterior wall with screws. Similar keyhole slots may also be provided in the bottom flange 130, in lieu of holes 145-155.

Figure 5:
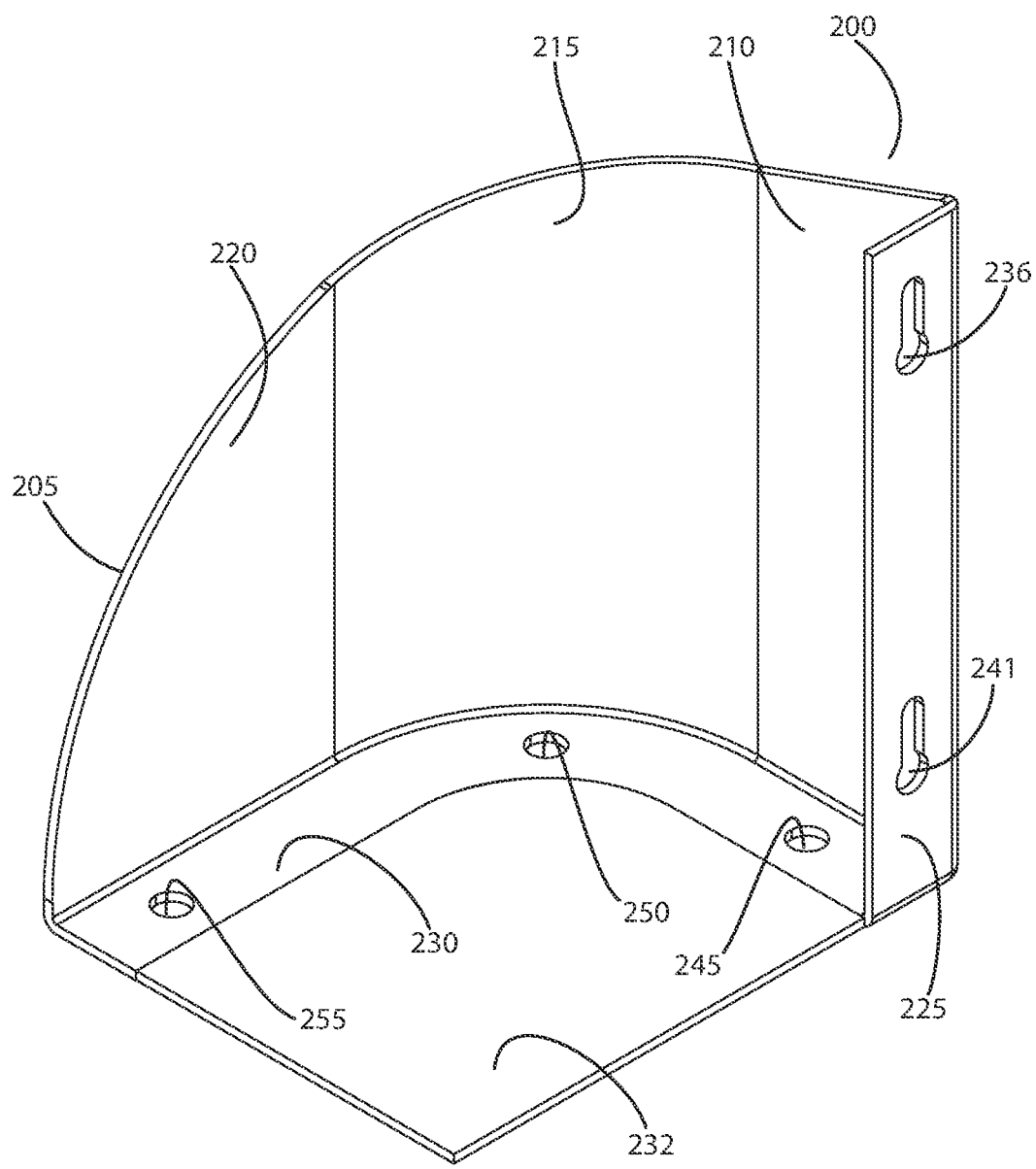
FIG. 5 is a perspective view of another exemplary left-side deflector according to principles of the invention.

FIG. 5 is a perspective view of a left-side deflector that is a mirrored structured of the deflector of FIG. 4. The base is comprised of a bottom wall 232 extending horizontally from the bottom edge of the wall 205 between the flanges 225, 230. The bottom wall provides a broad support base for the deflector 200. The bottom wall 232 may be a separate component attached to the bottom flange 230. Such attachment may be made by snap fit coupling, tongue and groove coupling, mechanical fastening, bonding, ultrasonic welding, or any other means for joining walls edge to edge. Alternatively, the bottom wall 232 and bottom flange 230 may be integrally formed. The vertical flange includes keyhole slots 236, 241, to facilitate attachment and removal from an exterior wall with screws. Similar keyhole slots may also be provided in the bottom flange 230, in lieu of holes 245-255.

Figure 6:
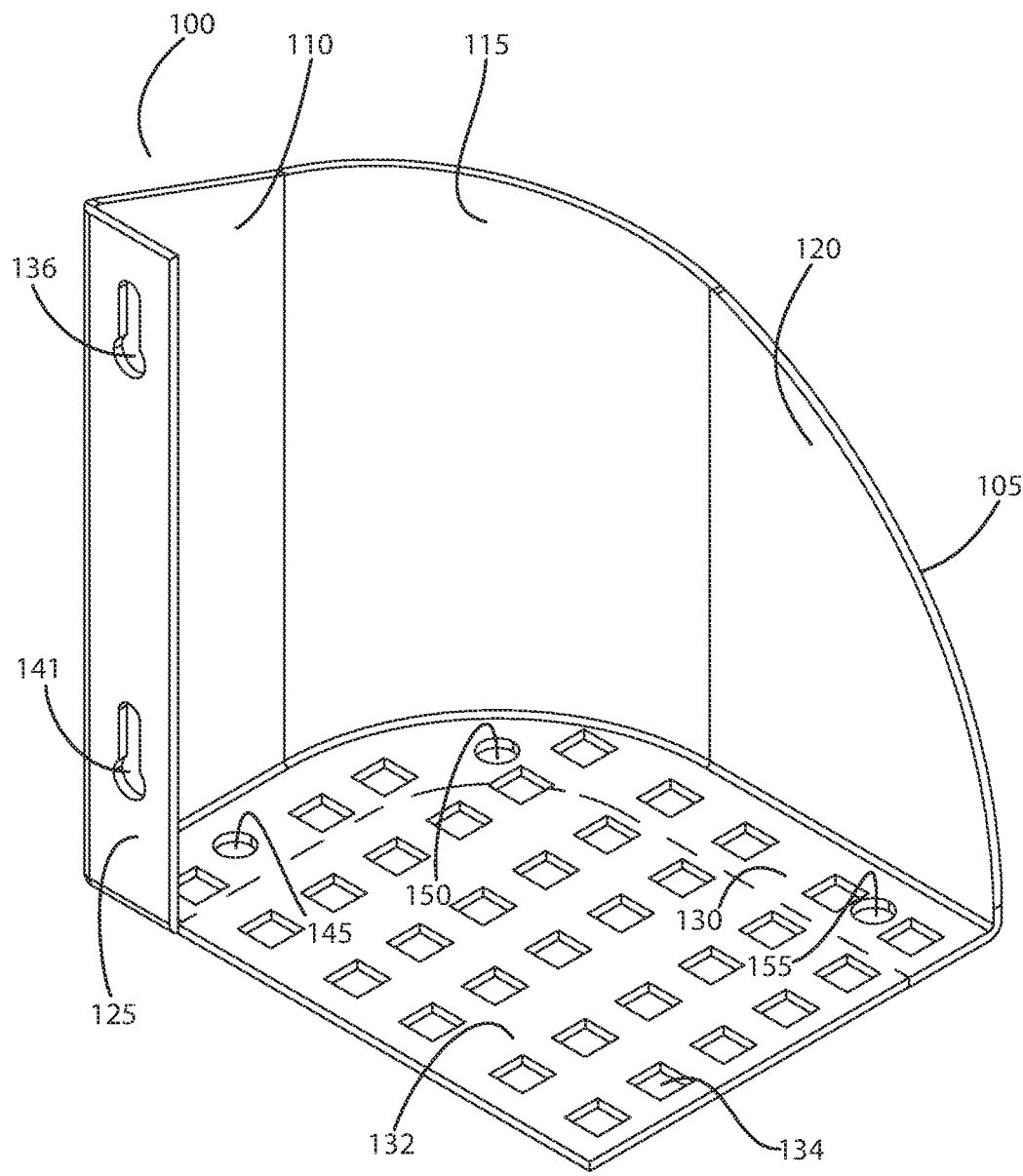
FIG. 6 is a perspective view of another exemplary right-side deflector according to principles of the invention.

FIG. 6 is a perspective view of another exemplary right-side deflector 100 according to principles of the invention. In this embodiment, the base is comprised of a bottom wall 132 extending horizontally from the bottom edge of the wall 105 between the flanges 125, 130. The bottom wall provides a broad support base for the deflector 100. The bottom wall 132 may be a separate component attached to the bottom flange 130. Such attachment may be made by snap fit coupling, tongue and groove coupling, mechanical fastening, bonding, ultrasonic welding, or any other means for joining walls edge to edge. Alternatively, the bottom wall 132 and bottom flange 130 may be integrally formed.

Additionally, in this embodiment, the bottom wall is perforated with a plurality of perforations 134. The perforations 134 are openings that extend through the base. The perforations 134 may be formed during plastic molding or formed in the base after molding, such as with a die. The perforations 134 reduce weight and facilitate drainage.

Figure 7:
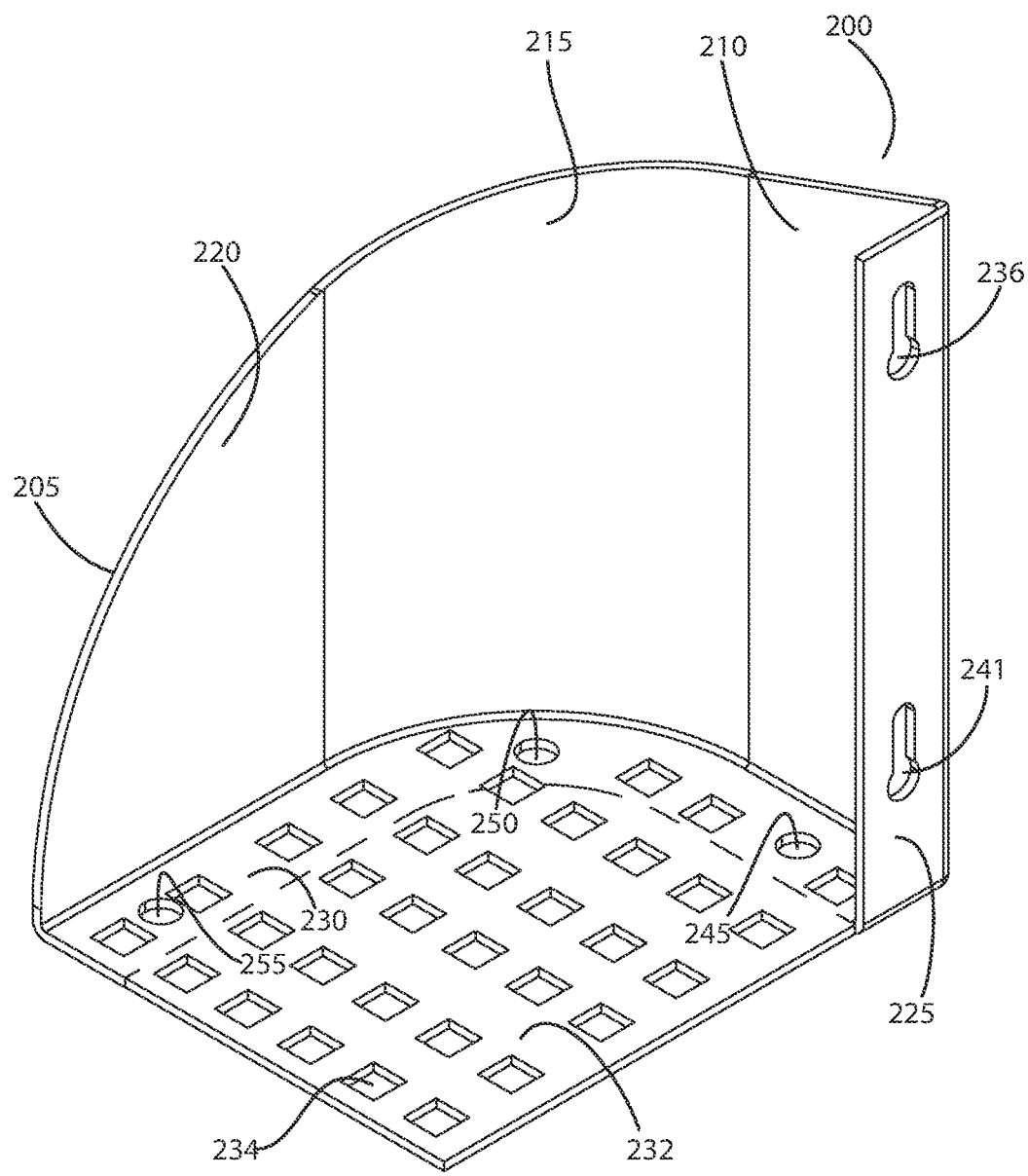
FIG. 7 is a perspective view of another exemplary left-side deflector according to principles of the invention.

FIG. 7 is a perspective view of another exemplary left-side deflector 200 that is a mirrored structured of the deflector of FIG. 6. The base is comprised of a bottom wall 232 extending horizontally from the bottom edge of the wall 205 between the flanges 225, 230. The bottom wall provides a broad support base for the deflector 200. The bottom wall 232 may be a separate component attached to the bottom flange 230. Such attachment may be made by snap fit coupling, tongue and groove coupling, mechanical fastening, bonding, ultrasonic welding, or any other means for joining walls edge to edge. Alternatively, the bottom wall 232 and bottom flange 230 may be integrally formed.

Additionally, in this embodiment, the bottom wall is perforated with a plurality of perforations 234. The perforations 234 are openings that extend through the base. The perforations 234 may be formed during plastic molding or formed in the base after molding, such as with a die. The perforations 234 reduce weight and facilitate drainage.

Figure 8:
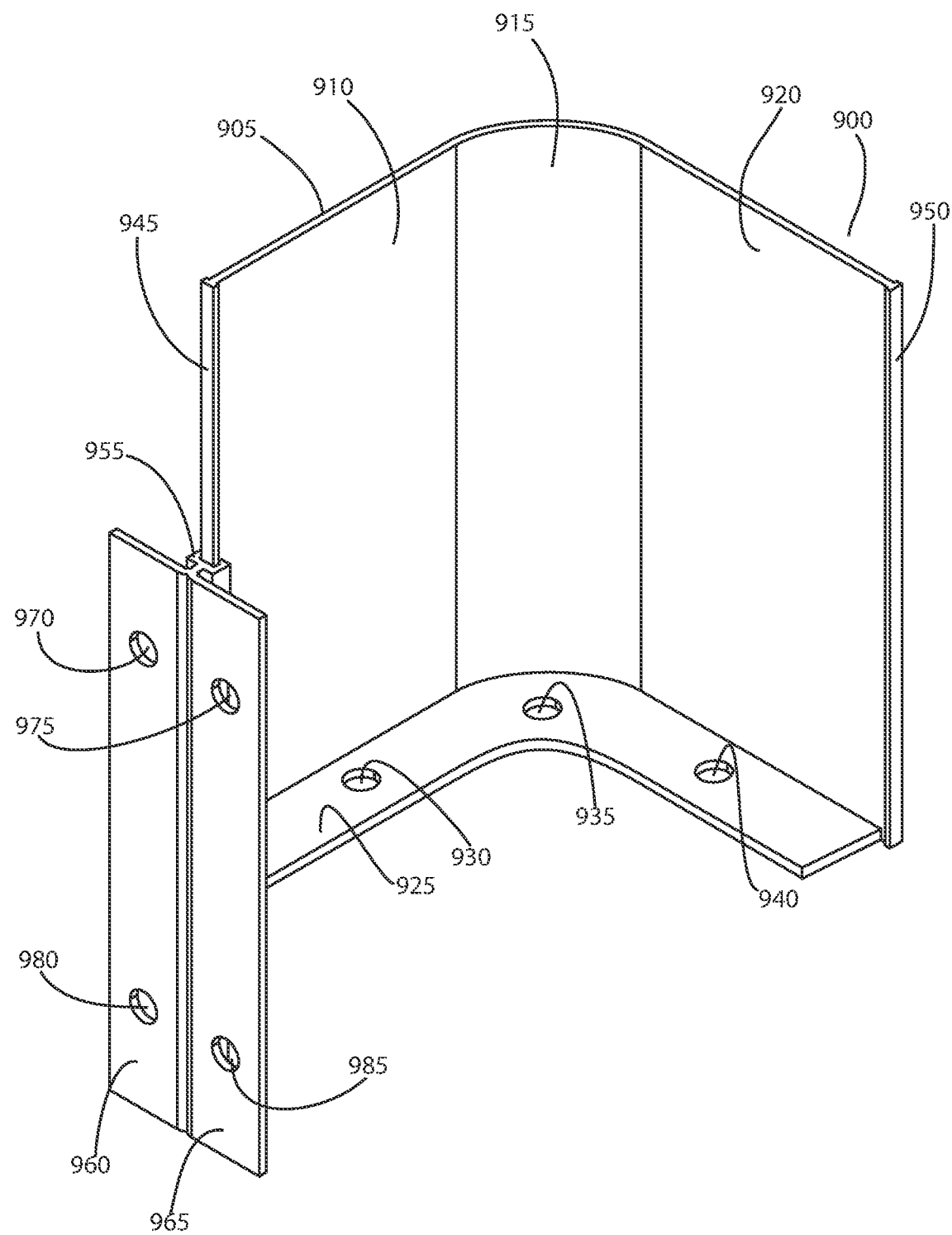
FIG. 8 is a perspective view of an exemplary adjustable deflector according to principles of the invention.

FIG. 8 is a perspective view of an exemplary adjustable deflector 900 according to principles of the invention.

The deflector 900 includes a curved wall 905, with a concave side 915, a proximal portion of the wall 910 extending at a right angle from the vertical flange 990, and a distal portion of the wall 920 extending substantially parallel to the vertical flange 990. The base is comprised of a bottom flange 925. The vertical flange 990 attaches to a vertical edge of the wall 905. The bottom flange 925 extends outwardly from the bottom edge of the wall 905. Mounting holes 930-940, 970-985 are provided in the flanges 925, 990. The flanges 925, 990 may be mechanically fastened to an exterior wall and ground with screws and/or anchors, or may be bonded with an adhesive or double-sided tape.

Unlike prior embodiments, the vertical flange 990 extends to both sides of the wall 905. The vertical flange 990 includes an elongated slot 955. Additionally, unlike prior embodiments, the wall 905 includes two vertical edges, each having a T-shaped edge 945, 950. The vertical slot 955 extends from the side of the vertical flange 990 facing the vertical edge of the wall 905. The slot 955 is shaped and sized to receive either T-shaped edge 945 of the wall 905. Inserting edge 945 in the slot 955 creates a deflector for one side of an opening. Inserting edge 950 in the slot 955 creates a deflector for the opposite side of the opening. Thus, the embodiment of FIG. 8 provides a deflector than can be configured for either side of an opening, in accordance with the principles of the invention. The free-end of the wall ending with the T-shaped edge may be coupled to a decorative tip equipped with a mating T-shaped groove.

Figure 9:
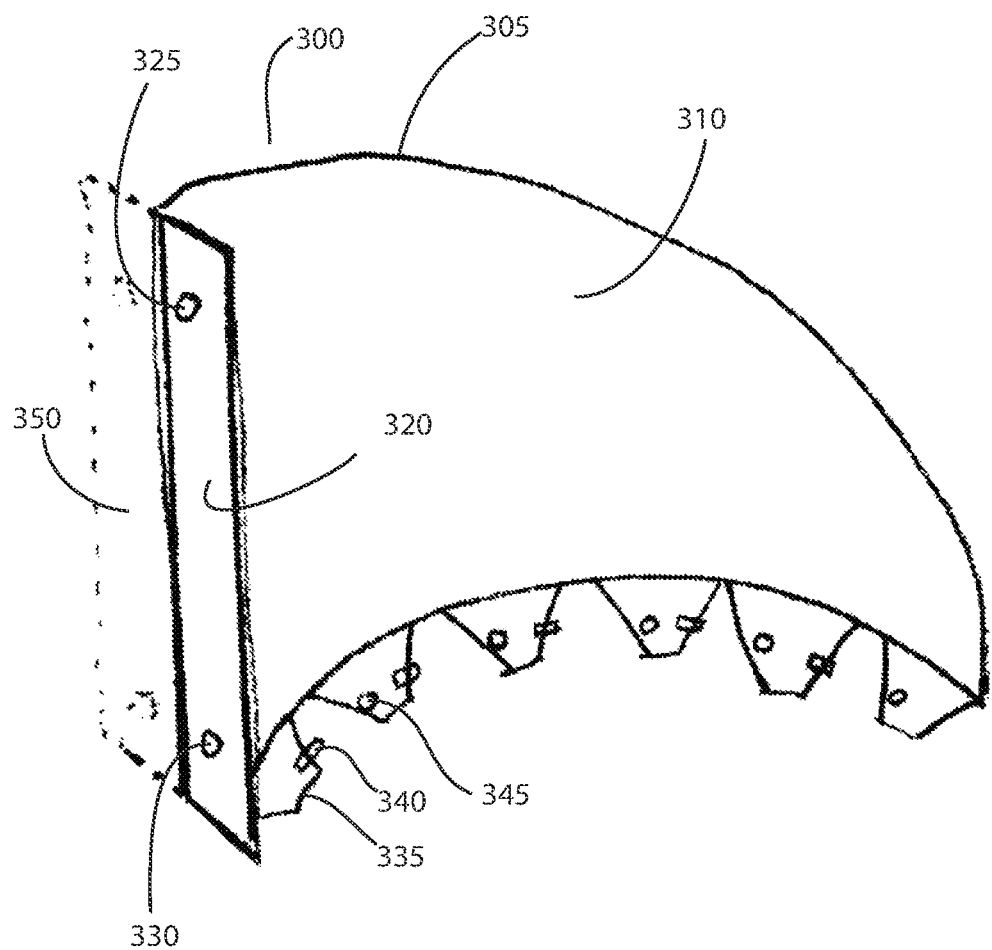
FIG. 9 is a perspective view of an exemplary flexible deflector according to principles of the invention.

FIG. 9 is a perspective view of an exemplary flexible deflector according to principles of the invention. The deflector 300 of FIG. 9 includes a flexible wall 305. The deflector may be stored with the wall 305 in a planar configuration, to conserve storage space. During installation, the wall 305 may be bent to form a concave 310 shape. The base is comprised of a plurality of spaced apart angled tabs 335, with hook-like male connectors 340 and adjacent female connectors 345. When the wall 305 is bent to the curved shape, the male connectors 340 engage the female connectors 345 to secure the wall 305 in the curved shape. As with other embodiments described above, a vertical flange 320 with mounting holes 325, 330 is provided to secure the deflector 300 to an exterior wall. Such a deflector 300 may be configured with tabs 335 extending to the opposite side of the wall 305 and a vertical flange 350 extending towards the opposite side of the wall 305.

Figure 10:
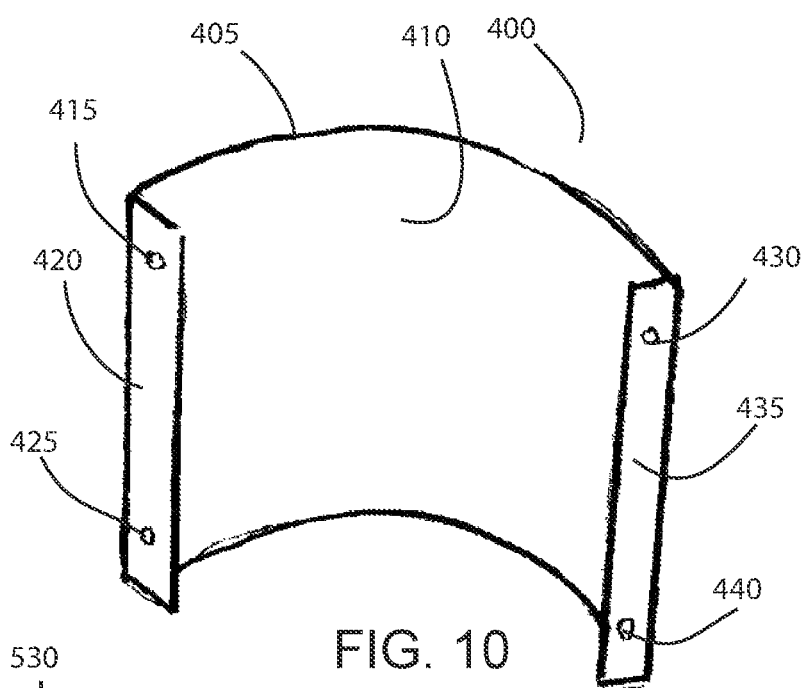
FIG. 10 is a perspective view of an exemplary two-sided deflector according to principles of the invention.

A two-sided reversible deflector 400 is conceptually illustrated in FIG. 10. The deflector 400 includes a pair of vertical flanges 420, 435. Each flange is located at a vertical edge of the wall 405. The flanges 420, 435 extend perpendicular to the edge of the wall 405, towards the concave side 410 of the wall 405. Each flange includes mounting holes 415, 425 and 430, 440. Either vertical flange 420, 435 may be attached to an exterior wall of an enclosure. Thus, such a deflector 400 may be used on the right side of an opening, and also on the left side of an opening.

Figure 11:
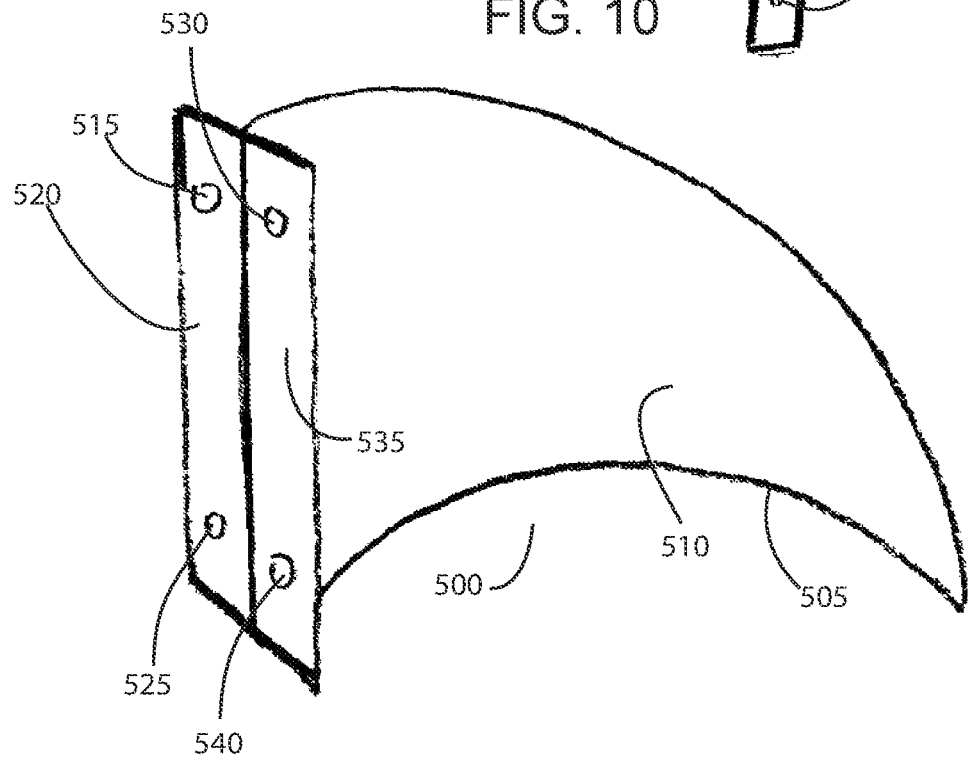
FIG. 11 is a perspective view of another exemplary deflector according to principles of the invention.

The deflector 500 of FIG. 11 includes a wall 505, that may be bent with a concave 510 contour on either side of the wall 505. The bend may be determined and set at manufacture. Alternatively, the bend may be determined by a user. For example, the wall 505 may be flexible. A metal spline or strip may be embedded or attached to the wall. The spline may be bent, but is rigid enough to hold the flexible wall 505 in the desired bent position.

Alternatively, the wall may be comprised of a thermoplastic with a low forming temperature, such as, but not limited to, a thin-gauge flexible or plasticized polyvinyl chloride (PVC) with a forming temperature of 110 to 150 C. After heating the wall 505 of the deflector 500 with a heat gun or oven to the forming temperature, the wall 505 may be bent free-form or around a curved object such as a coffee can, and then allowed to cool. Upon cooling, the wall 505 will retain its shape.

Figure 12:
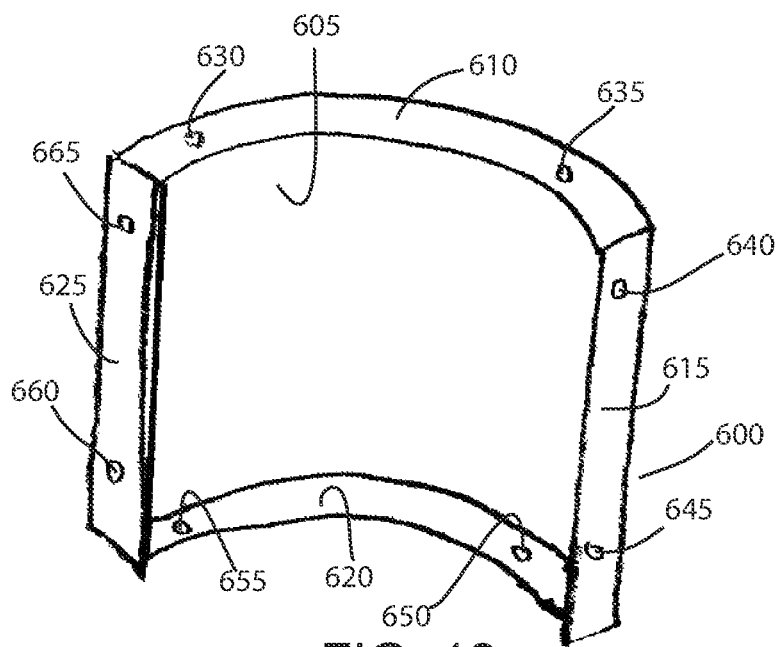
FIG. 12 is a perspective view of another exemplary two-sided deflector according to principles of the invention.

Another reversible deflector 600 is conceptually illustrated in FIG. 12. The deflector 600 includes a pair of vertical flanges 615, 625. Each flange is located at a vertical edge of the wall 605. The flanges 615, 625 extend perpendicular to the edge of the wall 605, towards the concave side of the wall 605. A base flange 620 and an opposite flange 610 are also provided. Each flange includes mounting holes 630, 635 and 640, 645 and 650, 655 and 660, 665. The holes in the base 620 and opposite flange 610 may be sized and/or positioned differently, allowing a user to decide which hole pattern should be positioned on the bottom.

Figure 13:
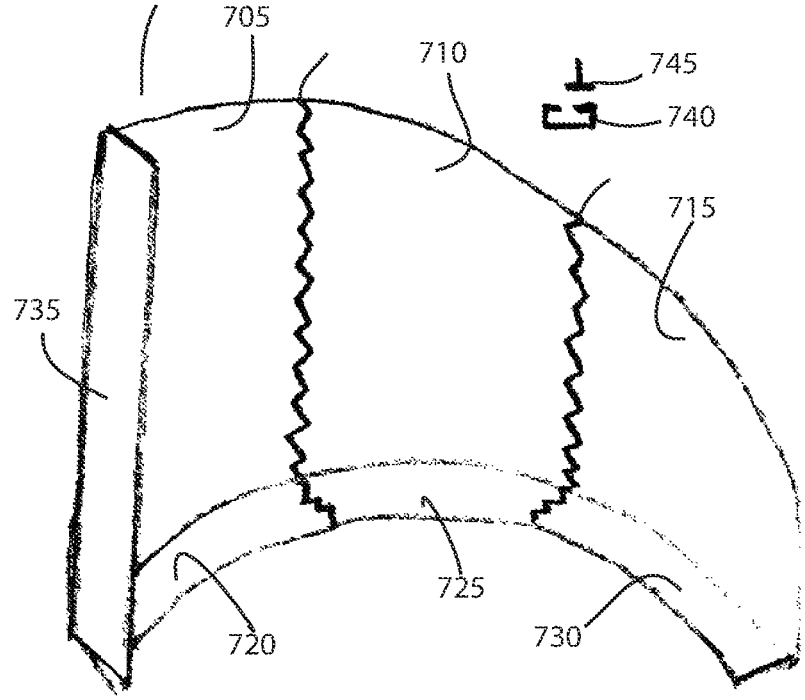
FIG. 13 is a perspective view of an exemplary jointed deflector according to principles of the invention.

FIG. 13 conceptually illustrates another exemplary jointed deflector 700 according to principles of the invention. The wall and base are divided into separate segments 705 and 720, 710 and 725, 715 and 730 by dovetail or tongue and groove joints 750, 755. Each joint may comprise a T-shaped tail 745 received in a rectangular groove 740. The vertical flange 735 may be bonded or screwed to an exterior wall.

Figure 14:
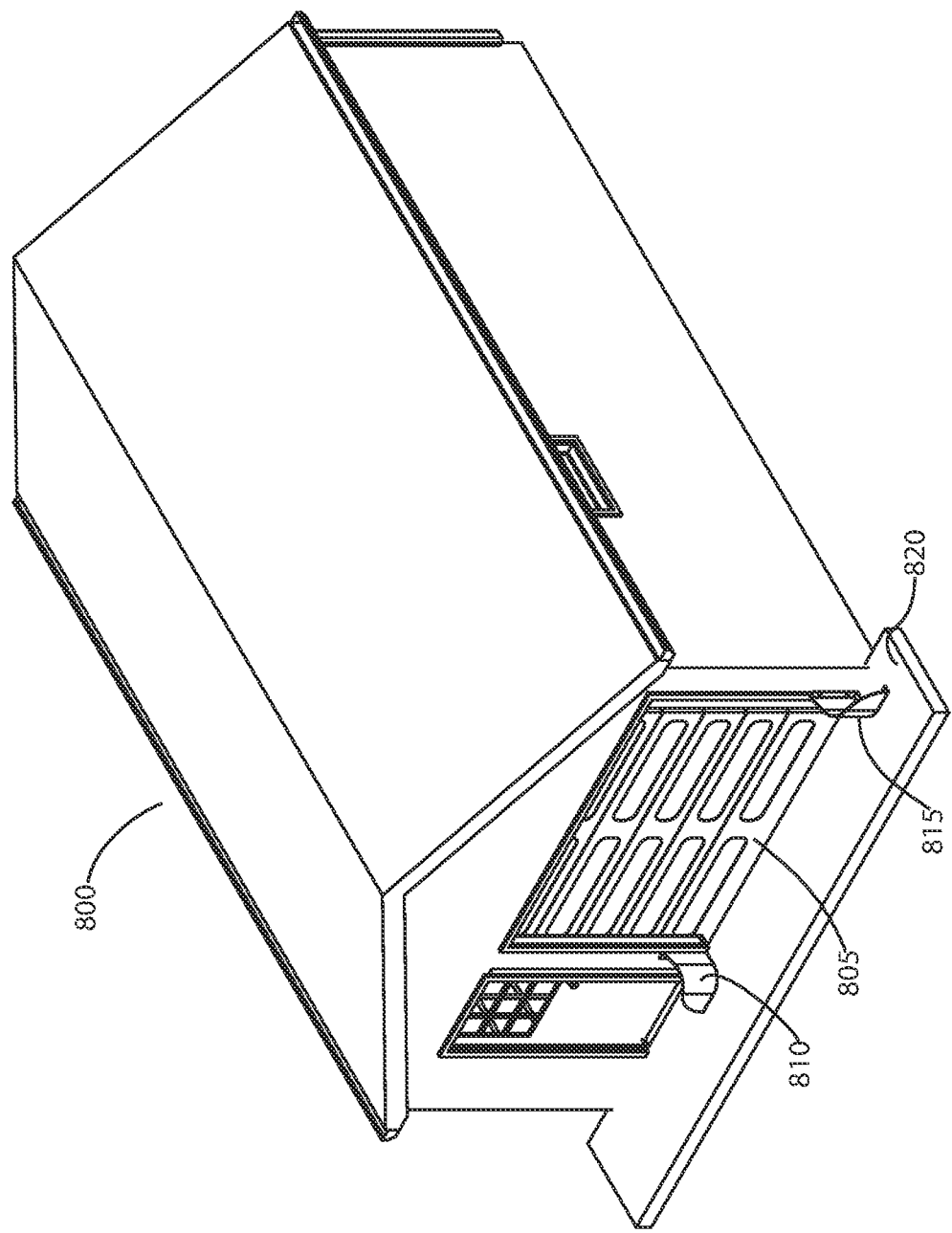
FIG. 14 is a perspective view of a garage with an exemplary pair of deflectors according to principles of the invention.
Figure 15:
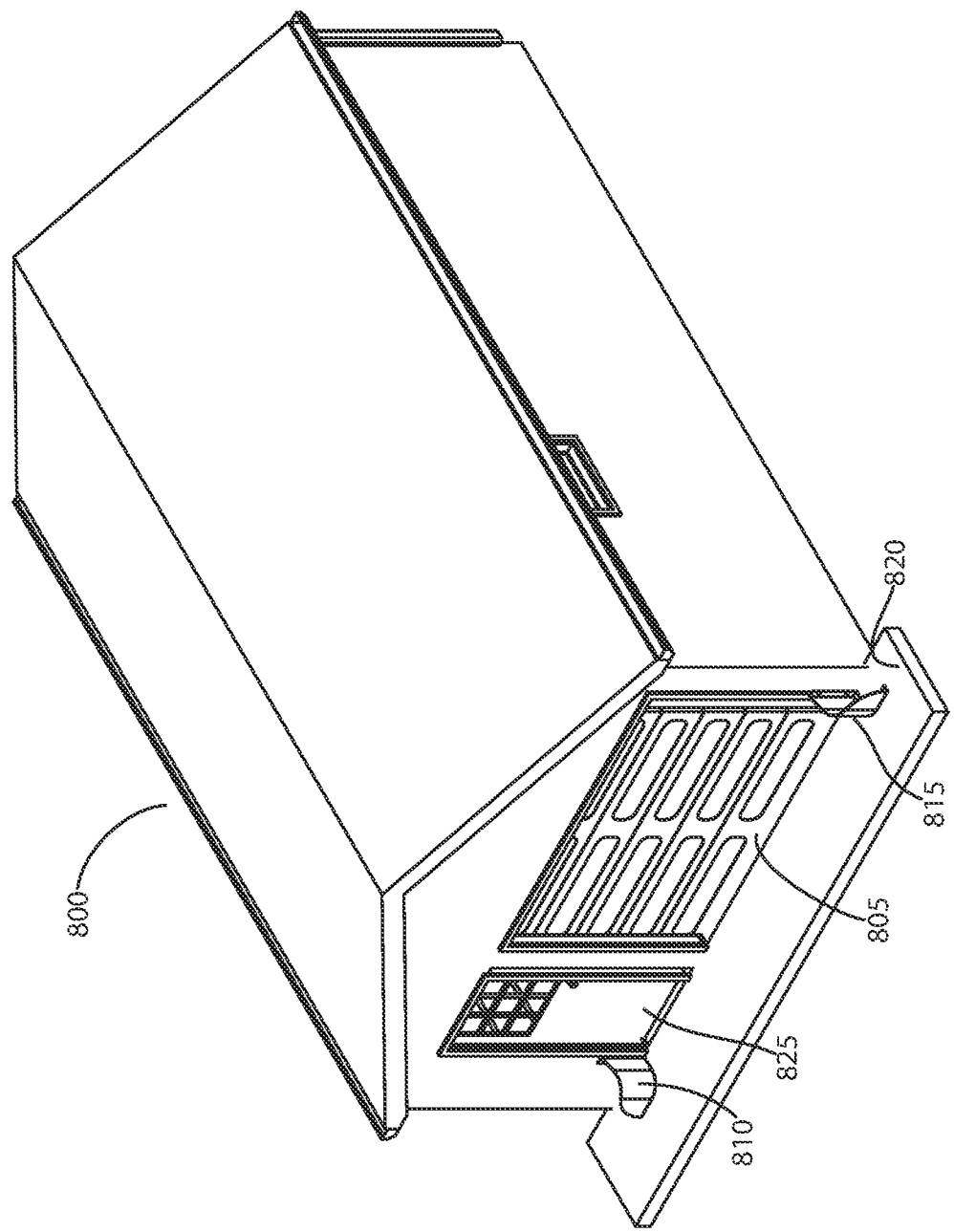
FIG. 15 is a perspective view of a garage with an exemplary pair of deflectors according to principles of the invention.

FIGS. 14 and 15 provide perspective views of a garage with an exemplary pair of deflectors according to principles of the invention. The garage 800 includes two openings, one covered with a garage door 805, and the other covered with a hinged swinging door 825. In FIG. 14, a pair of deflectors 810, 815 are secured to the exterior wall of the garage 800 and to the pad 820 leading to the garage 800, on each side of the garage door 805. Each deflector 810, 815 is oriented with the concave side facing away from the garage door 805. The deflectors 810, 815, will impede frogs, lizards, mice and other pests traveling along the wall of the garage towards the garage door 805. The impediment will prevent the pest from gaining entry through the garage door 805 opening.

In FIG. 15, a pair of deflectors 810, 815 are secured to the exterior wall of the garage 800 and to the pad 820 leading to the garage 800, on the right side of the door 825 and on the left side of the garage door 805. Each deflector 810, 815 is oriented with the concave side facing away from its respective door 805, 825. The deflectors 810, 815, will impede frogs, lizards, mice and other pests traveling along the wall of the garage towards the door 825 or garage door 805. The impediment will prevent the pest from gaining entry through the door 810 or garage door 805 opening.

A critter deflector according to principles of the invention is sized and shaped to discourage intrusion by small pests. Examples of such pests include lizards and toads. By way of example, a Southern Toad, prevalent in such states as Florida, generally ranges in length from 1.75 to 4.5 inches. The width of the toad is typically not greater than half its length, and, including legs in a normal stance, typically not greater than ¾ of the length. The concave compartment defined by the curved wall 105 is wide enough to receive such a toad. The height of the curved wall decreases as the wall extends away from the entrance (e.g., a door or garage door). The pest avoids the curved wall, thereby avoiding the entrance. The pest tends to move towards visible open areas, rather than face a wall or attempt to hop over the wall to the unknown on the opposite side. Often, a toad will follow the curved wall 105 to the lowest portion leading away from the entrance and proceed in that direction. The height of the wall nearest the entrance exceeds the length of the toad and obscures visibility. Without visibility beyond the wall, toads tend to follow the curved wall 105 past its lowest portion to an area not bound by the curved wall 105, and head in a direction opposite the entrance.

Similar behavior has been observed in lizards, such as brown and green anoles and geckos. Despite their incredible climbing ability, such lizards, when on the ground and otherwise approaching an entrance, such as a door or garage door, will change direction upon encountering the critter deflector.

While a critter deflector 100 according to principles of the invention may not prevent all pests from entering an entrance, it will prevent many pests from entering an entrance. When installed correctly, a critter deflector 100 according to principles of the invention will substantially reduce the risk of entry by unwanted pests, and subsequent death of pests in the enclosure followed by decay.

Figure 16:
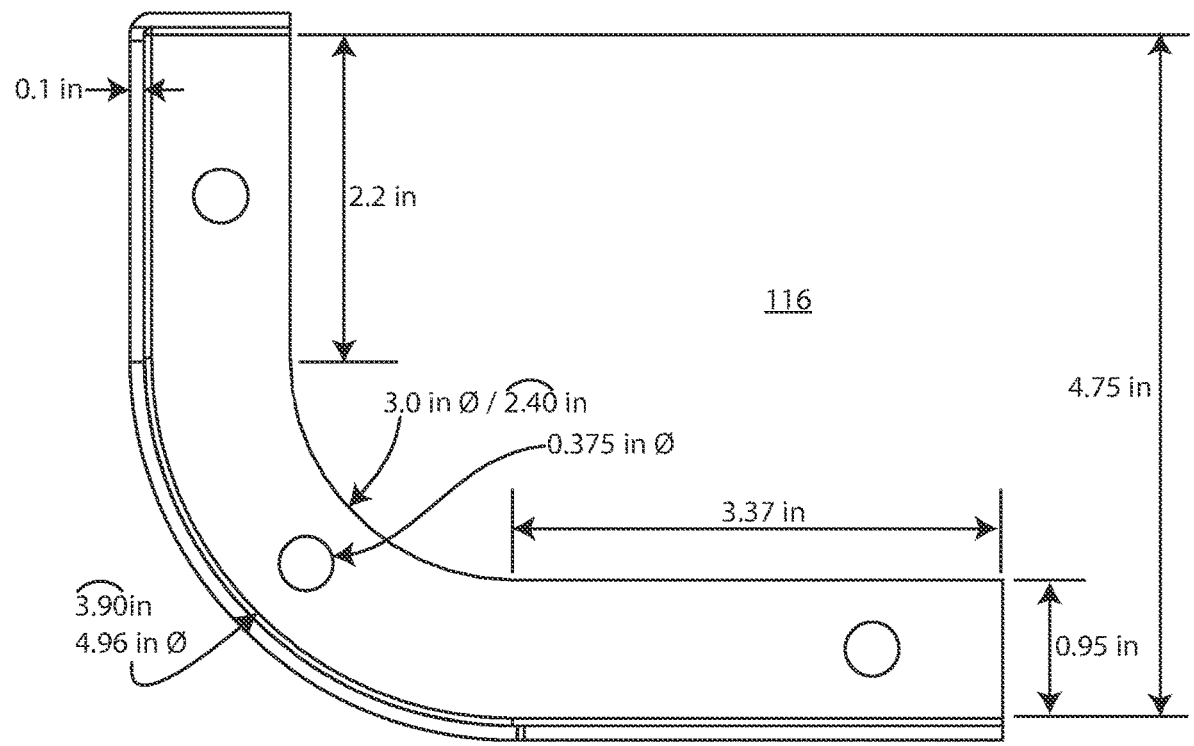
FIG. 16 is a plan view of a dimensioned exemplary deflector according to principles of the invention.
Figure 17:
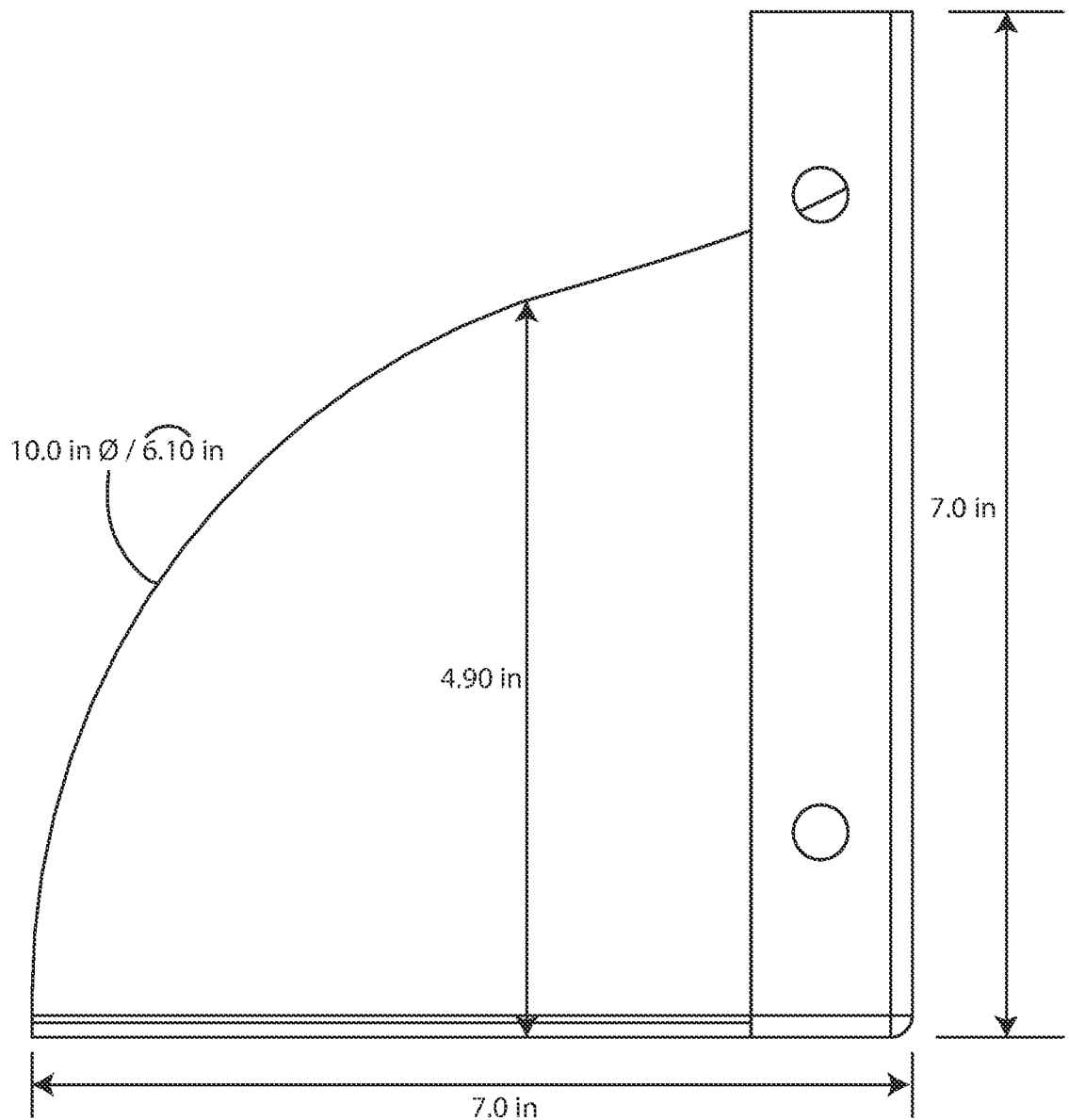
FIG. 17 is a profile view of a dimensioned exemplary deflector according to principles of the invention.

Referring to FIGS. 16 and 17, dimensioned views of an exemplary deflector according to principles of the invention are provided. The illustrated shapes and dimensions are nonlimiting examples of suitable shapes and dimensions for a deflector 100 according to principles of the invention. The scope of the invention is not limited to the depicted shapes and dimensions, which may be varied within the scope of the invention. Of note in the illustrated exemplary embodiment are the curvature of the wall 105 (in the plan view of FIG. 16) with a diameter of nearly 5 inches, the distance from vertical flange 125 to the distal portion of the wall 120 being about 4.75 inches, the maximum height at the vertical flange 125 of about 7 inches, and the curvature of the distal end of the curved wall (in the profile view of FIG. 17) with a diameter of about 10 inches. The proximal portion 110 of the curved wall 105 is about perpendicular (+/−10 degrees) to the distal portion 120 of the curved wall 105. The curved portion 115 extends from the proximal portion 110 to the distal portion 120. The vertical flange 125 is attached to the proximal end of the proximal portion 110 of the curved wall 105. The horizontal flange 130 is attached to the bottom end of the curved wall 105. The proximal portion 110, curved portion 115 and distal portion 120 define a concave compartment 116 having a width (measured from the vertical flange to the free end of the distal portion) of at least 3 inches (4.75 inches in FIG. 16). The proximal portion 100 of the curved wall has a height of at least 4 inches (7.0 inches in FIG. 17). The curved portion 115 of the curved wall 105 may have a radius of curvature of at least 2 inches (4.96 inch dia. in FIG. 16). The curved portion of the curved wall may have an arc length of at least 2.5 inches (3.9 inches in FIG. 16). The distance between the bottom end and the top edge may decrease from the curved portion of the curved wall to the distal portion of the curved wall. The top edge of the distal portion of the curved wall may define an arc having a radius of curvature of at least 3 inches (10.0 inch dia. in FIG. 17).

A second critter deflector 815 is a mirror copy of the first critter deflector 810, as shown in FIGS. 14, 15, 18. In FIG. 18, the mirroring line is parallel to the vertical flange.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A deflector for attachment adjacent to an edge of a building entrance, the deflector comprising:
   a first critter deflector comprising:
      a curved wall having a proximal portion, a distal portion, a curved portion, a top edge and a bottom end, the proximal portion of the curved wall being about perpendicular to the distal portion of the curved wall, the curved portion extending from the proximal portion to the distal portion, the proximal portion including a proximal end; and
   a vertical flange attached to the proximal end of the proximal portion of the curved wall;
      a horizontal flange attached to the bottom end of the curved wall; and
      the proximal portion, curved portion and distal portion defining a concave compartment, the concave compartment having a width of at least 3 inches; and
      the proximal portion of the curved wall having a height of at least 4 inches.

2. The deflector of claim 1, further comprising a second critter deflector being a mirror copy of the first critter deflector along a mirroring line parallel to the vertical flange.

3. The deflector of claim 1, the vertical flange having a plurality of mounting holes, and the horizontal flange having a plurality of mounting holes.

4. The deflector of claim 1, the curved portion of the curved wall having a radius of curvature of at least 2 inches.

5. The deflector of claim 4, the curved portion of the curved wall having an arc length of at least 2.5 inches.

6. The deflector of claim 1, the distance between the bottom end and the top edge decreasing from the curved portion of the curved wall to the distal portion of the curved wall.

7. The deflector of claim 1, the top edge of the distal portion of the curved wall defining an arc having a radius of curvature of at least 3 inches.

8. The deflector of claim 1, the horizontal flange comprising a base, the base extending from the bottom edge, perpendicular to the vertical flange, and the base having a first edge and a second edge, the first edge being aligned with the vertical flange, and the second edge being perpendicular to the first edge and extending to the bottom edge at the distal portion of the curved wall.

9. The deflector of claim 1, the base being perforated with a plurality of openings.

10. The deflector of claim 1, the first critter deflector being integrally formed.

11. The deflector of claim 2, the first critter deflector being integrally formed and the second critter deflector being integrally formed.

12. The deflector of claim 11, the first critter deflector being formed of molded plastic and the second critter deflector being formed of molded plastic.

13. A deflector for an edge of a building entrance comprising:
   a first critter deflector comprising:
      a curved wall having a proximal portion, a distal portion, a curved portion, a top edge and a bottom end, the proximal portion of the curved wall being about perpendicular to the distal portion of the curved wall, the curved portion extending from the proximal portion to the distal portion, the proximal portion including a proximal end; and
      a vertical flange attached to the proximal end of the proximal portion of the curved wall; and
      a horizontal flange attached to the bottom end of the curved wall; and
      the proximal portion, curved portion and distal portion defining a concave compartment, the concave compartment having a width of at least 3 inches; and
   a building wall having an entrance with a first side edge and a second side edge; and
   the first critter deflector being positioned adjacent to the first side edge of the entrance, the vertical flange of the first critter deflector being against the wall, and the concave compartment of the first critter deflector facing away from the entrance.

14. The deflector for an edge of a building entrance according to claim 13, further comprising:
   a second critter deflector comprising:
      a curved wall having a proximal portion, a distal portion, a curved portion, a top edge and a bottom end, the proximal portion of the curved wall being about perpendicular to the distal portion of the curved wall, the curved portion extending from the proximal portion to the distal portion, the proximal portion including a proximal end; and
      a vertical flange attached to the proximal end of the proximal portion of the curved wall; and
      a horizontal flange attached to the bottom end of the curved wall; and
      the proximal portion, curved portion and distal portion defining a concave compartment, the concave compartment having a width of at least 3 inches; and
      the proximal portion of the curved wall having a height of at least 4 inches; and
   the second critter deflector being positioned adjacent to the second side edge of the entrance, the vertical flange of the second critter deflector being against the wall, and the concave compartment of the second critter deflector facing away from the entrance.

15. The deflector for an edge of a building entrance according to claim 13, the vertical flange of the first critter deflector having a plurality of mounting holes, and the horizontal flange of the first critter deflector having a plurality of mounting holes.

16. The deflector for an edge of a building entrance according to claim 13, the curved portion of the curved wall of the first critter deflector having a radius of curvature of at least 2 inches.

17. The deflector for an edge of a building entrance according to claim 13, the distance between the bottom end and the top edge of the curved wall of the first critter deflector decreasing from the curved portion of the curved wall to the distal portion of the curved wall.

18. The deflector for an edge of a building entrance according to claim 13, the top edge of the distal portion of the curved wall of the first critter deflector defining an arc having a radius of curvature of at least 3 inches.

19. The deflector for an edge of a building entrance according to claim 13, the horizontal flange of the first critter deflector comprising a base, the base extending from the bottom edge, perpendicular to the vertical flange, and the base having a first edge and a second edge, the first edge being aligned with the vertical flange, and the second edge being perpendicular to the first edge and extending to the bottom edge at the distal portion of the curved wall, and the base being perforated with a plurality of openings.

20. The deflector for an edge of a building entrance according to claim 13, the vertical flange of the first critter deflector being attached to the wall.

* * * * *